United States Patent
Jabcon (12) 
(10) Patent No.: US 6,405,757 B1
(45) Date of Patent: Jun. 18, 2002

(54) LOW POWER SOLENOID VALVE ASSEMBLY

(75) Inventor: Leonard J. Jabcon, Kalamazoo, MI (US)

(73) Assignee: Humphrey Products Company, Kalamazoo, MI (US)

( * ) Notice: Subject to any disclaimer, the term of this patent is extended or adjusted under 35 U.S.C. 154(b) by 0 days.

(21) Appl. No.: 09/631,143

(22) Filed: Aug. 1, 2000

(51) Int. Cl.[7] .................... F15B 13/044; F16K 31/06
(52) U.S. Cl. ........................ 137/625.65; 251/129.21; 335/301
(58) Field of Search ............... 137/625.25; 251/129.21; 335/301

(56) References Cited

U.S. PATENT DOCUMENTS

| | | | |
|---|---|---|---|
| 3,172,637 A | 3/1965 | Adams et al. ............... 251/85 |
| 3,521,851 A | 7/1970 | Sorrow ...................... 251/85 |
| 4,159,026 A | 6/1979 | Williamson ............... 137/625.5 |
| 4,501,299 A | 2/1985 | Klimowicz et al. .... 137/625.65 |
| 4,746,888 A | 5/1988 | Ichihashi et al. ........... 335/262 |
| 4,809,749 A | 3/1989 | Ichihashi ............... 137/625.65 |
| 4,844,122 A | 7/1989 | Ichihashi ............... 137/625.65 |
| 4,971,114 A | 11/1990 | Ichihashi et al. ...... 137/625.65 |
| 5,127,624 A | * 7/1992 | Domke ............. 137/625.65 X |
| 5,605,178 A | 2/1997 | Jennins .................. 137/625.65 |
| 6,050,542 A | * 4/2000 | Johnson et al. ..... 137/625.65 X |
| 6,105,931 A | * 8/2000 | Frank et al. ........ 251/129.21 X |

FOREIGN PATENT DOCUMENTS

DE 2321100 * 11/1974 ............ 137/625.65

* cited by examiner

Primary Examiner—Gerald A. Michalsky
(74) Attorney, Agent, or Firm—Van Dyke, Gardner, Linn & Burkhart, LLP (57) ABSTRACT

An electrically-operated three-way plunger-type solenoid valve assembly includes a housing, a valve seat insert provided in the housing, an electromagnetic actuator, and an exhaust port body, which extends into a sleeve passage of the electromagnetic actuator. A non-magnetic member is positioned in the sleeve passage of the electromagnetic actuator and includes an orifice in communication with an exhaust passage of the exhaust port body. A plunger is positioned in the non-magnetic member and supported for reciprocal axial movement in the non-magnetic member. A biasing member is provided which applies a spring force to the plunger, with the electromagnetic actuator generating a magnetic field having sufficient magnitude to move the plunger against the force of the biasing member. In this manner, the electromagnetic actuator selectively moves the plunger to control the communication between inlet and outlet openings of the valve to open and closed the valve. The non-magnetic member provides a magnetic gap between the plunger and the electromagnetic actuator and the exhaust port body to magnetically isolate the plunger from any residual magnetic field remaining in the electromagnetic actuator and the exhaust port body after the electromagnetic actuator is de-energized thereby reducing the required force of the biasing member and, further, forming a quick response valve.

50 Claims, 7 Drawing Sheets

LOW POWER SOLENOID VALVE ASSEMBLY

TECHNICAL FIELD AND BACKGROUND OF THE INVENTION

The present invention relates to a solenoid valve and, more particularly, to plunger-type solenoid valves which are suitable for use in control systems, control system components, including control valves, pneumatic cylinders or the like, and battery operation, micro processor control and printed circuit board type applications.

Conventional plunger-type solenoid valves includes a housing having a transverse passage formed therein, which is in communication with a primary port, a secondary port and a discharge port. A plunger is received in the transverse passage of the housing for movement along the passage, with the movement of the plunger controlling the communication between the ports to thereby open and close the valve. The movement of the plunger is controlled by an electromagnetic actuator, which is mounted in the housing. When electric current is applied to the electromagnetic actuator, a force is applied to the plunger which moves the plunger along the transverse passage to vary the communication between the ports.

One of the disadvantages of known solenoid valves is their power requirements, which produces as a by-product, undesirable levels of heat during the valve operation. An additional disadvantage to known solenoid valve design is the fact that two magnetic air gaps exist in the magnetic circuit that increase as the stroke of the valve increases. It is understood that the force exerted by the magnetic flux upon the plunger is what causes the plunger to move and close the valve. For a given electrical input, the stronger the magnetic flux present in the magnetic circuit, the longer the valve stroke can be and this is usually accomplished with higher levels of electrical input. Known solenoid valve technology suffers from the fact that as the stroke length increases, both magnetic air gaps increase, thus quickly reducing the flux density of the magnetic circuit and thereby limiting the amount of valve stroke available for a given electrical input. In addition, the cycling rate of conventional solenoid valves is hampered by the residual magnetism that remains after the electromagnetic actuator is de-energized. The residual magnetism delays the movement of the armature thus reducing the response of the valve. In order to increase valve response, larger springs may be employed; however, larger springs require an increase in the magnetic field, hence, increasing the power requirements of the valve.

Typically, these solenoid valves are used to control small volumes of air and, therefore, have small dimensions. Ideally, the size of the valve should be minimized while maximizing the efficiency of the solenoid valves so as to reduce the power consumption thereof. Heretofore, the solenoid valves have employed plunger strokes of about $1/32$ of an inch. With such stroke requirements, the power requirement of the solenoid valve is quite substantial and may be prohibitive for electronic type applications where the power supply is relative low and/or, further, where the heat generated by such power requirements risk malfunction or destruction of the various electronic devices associated therewith.

Another disadvantage of a typical solenoid valve is that the manufacturing tolerances of the individual parts often exceed the desired stroke size of the valve. As a result, the assembly of such valves has heretofore typically required pre-assembly of each individual solenoid valve so as to permit precise measurement of the actual gap or stroke between the plunger and the valve seat. After the solenoid valve is assembled, the valve is disassembled with suitable adjustments made to reduce or increase the gap to achieve the desired stroke within an acceptable tolerance. As a result, this type of production procedure is extremely time consuming and costly.

Consequently, there is a need for a plunger-type solenoid valve which can operate within desired perimeters while consuming less power than conventionally known solenoid valves thus reducing the heat generation of the valve. Furthermore, there is a need for a solenoid valve that is easier to assemble and, therefore, less costly to manufacture.

SUMMARY OF THE INVENTION

The present invention provides a solenoid valve assembly which consumes less power than conventionally known solenoid valves, thus, permitting increased stroke lengths for a given power consumption. With increased stroke lengths, the valve assembly can be assembled in a more cost efficient process.

In one form of the invention, an electrically-operated plunger type solenoid valve assembly includes a housing, with an inlet port and an outlet port, and an electromagnetic actuator positioned in an interior chamber of the housing. The actuator defines a transverse sleeve passage therethrough and is adapted to be selectively energized to generate a magnetic field. An exhaust port body extends into the sleeve passage of the actuator and includes an exhaust passage which defines an exhaust port to provide an exhaust path. A non-magnetic member is positioned in the sleeve passage and has an orifice in communication with the exhaust passage. A plunger is positioned in the non-magnetic member and is supported for reciprocal axial movement in the non-magnetic member between an open position and a closed position. When in the open position, the plunger seals the orifice in the non-magnetic member thereby sealing the exhaust passage, and the inlet port and the outlet port are in communication thereby opening the valve assembly. When moved to the closed position, the plunger seals the inlet port whereby the valve assembly is closed leaving the outlet port in communication with the exhaust port through the exhaust passage. The valve assembly further includes a biasing member which urges the plunger to the closed position. The electromagnetic actuator generates a magnetic field having sufficient magnitude to overcome the force of the biasing member to move the plunger to the open position when the electromagnetic actuator is energized to selectively move the plunger between its open and closed positions to control the communication between the inlet port and the outlet port and the outlet port and the exhaust port. The magnetic forces causing the movement of the plunger are greatly strengthened by the fact that the plunger resides inside the top cap body in such a manner that the magnetic air gap between the two is minimized, fixed and does not change regardless of stroke. It is understood that the force exerted by the magnetic flux upon the plunger is what causes the plunger to move and close the valve. This magnetic force is proportional to the total area of the magnetic air gaps and the square of the magnetic flux density present in the air gap portions of the magnetic circuit. By having the plunger reside inside the top cap body, with the walls of each in close proximity to and parallel to each other axially, and separated by a non-magnetic sleeve, the smaller of the two magnetic air gaps in the magnetic circuit is effectively kept at a fixed minimum regardless of stroke. The effective of this orientation is to greatly increase the magnetic flux density in the remaining larger area air gap in the magnetic circuit. This in turn produces very large increases in magnetic force upon the plunger especially at longer distances, and allows longer strokes without having to increase electrical input. The non-magnetic member provides a magnetic gap between the plunger and the electromagnetic actuator and exhaust port body to magnetically isolate the plunger from a residual magnetic field remaining in the electromagnetic actuator and the exhaust port body after the electromagnetic actuator is deenergized energized thereby forming a quick response valve.

In one aspect, the electromagnetic actuator includes a spool, which defines the transverse sleeve passage. Preferably, the electromagnetic actuator includes a wire that is coiled around the spool and extends between end flanges of the spool. In other aspects, the valve assembly further includes a coil frame which supports the spool in the interior chamber of the housing.

In other aspects, the plunger has a generally T-shaped configuration having a cylindrical stem and a flange. The stem extends into the sleeve passage and has a first sealing surface to seal the orifice of the non-magnetic member when the plunger is moved to the first position. The flange includes a second sealing surface for sealing the inlet port when the plunger is moved to the second position. Preferably, the stem and/or the flange includes a seal member to provide the respective sealing surfaces. For example, the plunger may include a longitudinal passage and a unitary seal positioned in the passage, which provides both sealing surfaces.

In other aspects, the non-magnetic member includes a generally cup-shaped body having a portion extending into the exhaust port body and receiving a portion of the plunger whereby the plunger is in close proximity to the exhaust port body. In further aspects, the generally cup-shaped body includes a sleeve portion, which is spaced from the plunger and forms a cavity therebetween. The biasing member is positioned in the cavity and urges the plunger toward the valve seat insert to seal the inlet port. In yet further aspects, the valve assembly includes a valve seat insert which includes an inlet opening and an outlet opening, which are in communication with the inlet and outlet ports, respectively. In addition, the cup-shaped body includes a third portion, with the valve seat insert extending into and being seated in the third portion of the non-magnetic member to provide a compact assembly.

In another form of the invention, an electrically operated plunger-type solenoid valve assembly includes a housing, a base with an inlet port and an outlet port, a coil assembly, and an exhaust port body. The coil assembly is positioned in the housing and is adapted to be selectively energized to generate a magnetic field and has a transverse sleeve passage. The exhaust port body extends into one end of the sleeve passage and has an exhaust passage extending therethrough, with the exhaust passage defining an exhaust port. A non-magnetic member is positioned in a second end of the sleeve passage, with the non-magnetic member having an orifice in communication with exhaust passage of the exhaust port body. The valve assembly further includes a valve seat insert which is recessed in the non-magnetic member in the housing and includes an inlet opening and an outlet opening, which are in communication with inlet and outlet ports, respectively. A plunger is positioned in the non-magnetic member between the orifice of the non-magnetic member and the valve seat insert and is supported for reciprocal axial movement in the sleeve passage between an open position wherein the plunger is spaced from the valve seat to permit communication between the inlet and outlet ports and wherein the plunger seals the orifice of the non-magnetic member thereby sealing the exhaust passage, and a closed position wherein the plunger seals the inlet port whereby the valve assembly is closed. The biasing member applies a force to the plunger to urge the plunger to its closed position, with the coil assembly generating a magnetic field having sufficient magnitude to move the plunger against the force of the biasing member to move the plunger to its first position when the coil assembly is energized to selectively move the plunger between its open and closed positions to control communication between the inlet port, the outlet port, and the exhaust port. The plunger, biasing member, and valve seat insert are positionable in the non-magnetic member to provide a simplified assembly process.

In one aspect, the non-magnetic member comprises a cup-shaped liner. For example, the cup-shaped liner may be formed from a non-magnetic stainless steel. In other aspects, the liner preferably has a thickness in a range of 0.003 to 0.007 inches.

In other aspects, the exhaust port body includes a recessed annular surface extending around the opening of the exhaust passage which defines a recess. A portion of the non-magnetic member extends into the recess to provide a close fit between the plunger and the exhaust port body.

In other aspects, the biasing member comprises a spring, and the non-magnetic member defines a spring cavity adjacent the plunger. The spring is positioned in the spring cavity to urge the plunger to its second position.

It can be appreciated from the foregoing that a solenoid valve assembly is provided that isolates the plunger from the effects of the residual magnetic field that remains even after the coil assembly is de-energized. As a result, the valve can operate with lower power consumption and with greater speed. In addition, the stroke size may be increased while maintaining the power consumption at acceptable levels. Furthermore, with increased stroke lengths, the valve assembly can be manufactured in a more efficient manner, thus reducing the cost of the valve assembly.

These and other objects, advantages, purposes, and features of the invention will become more apparent from the study of the following description taken in conjunction with the drawings.

DETAILED DESCRIPTION OF THE DRAWINGS

DESCRIPTION OF THE PREFERRED EMBODIMENTS

Figure 1:
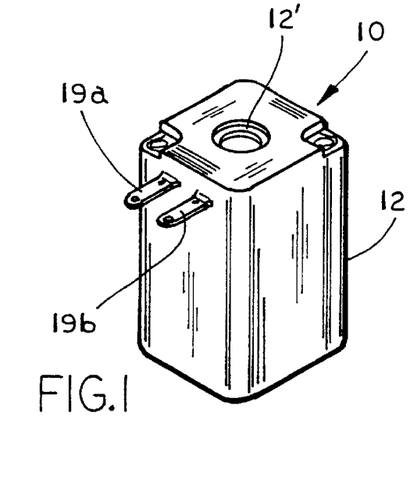
FIG. 1 is a perspective view of a plunger-type solenoid valve assembly of the present invention.
Figure 5:
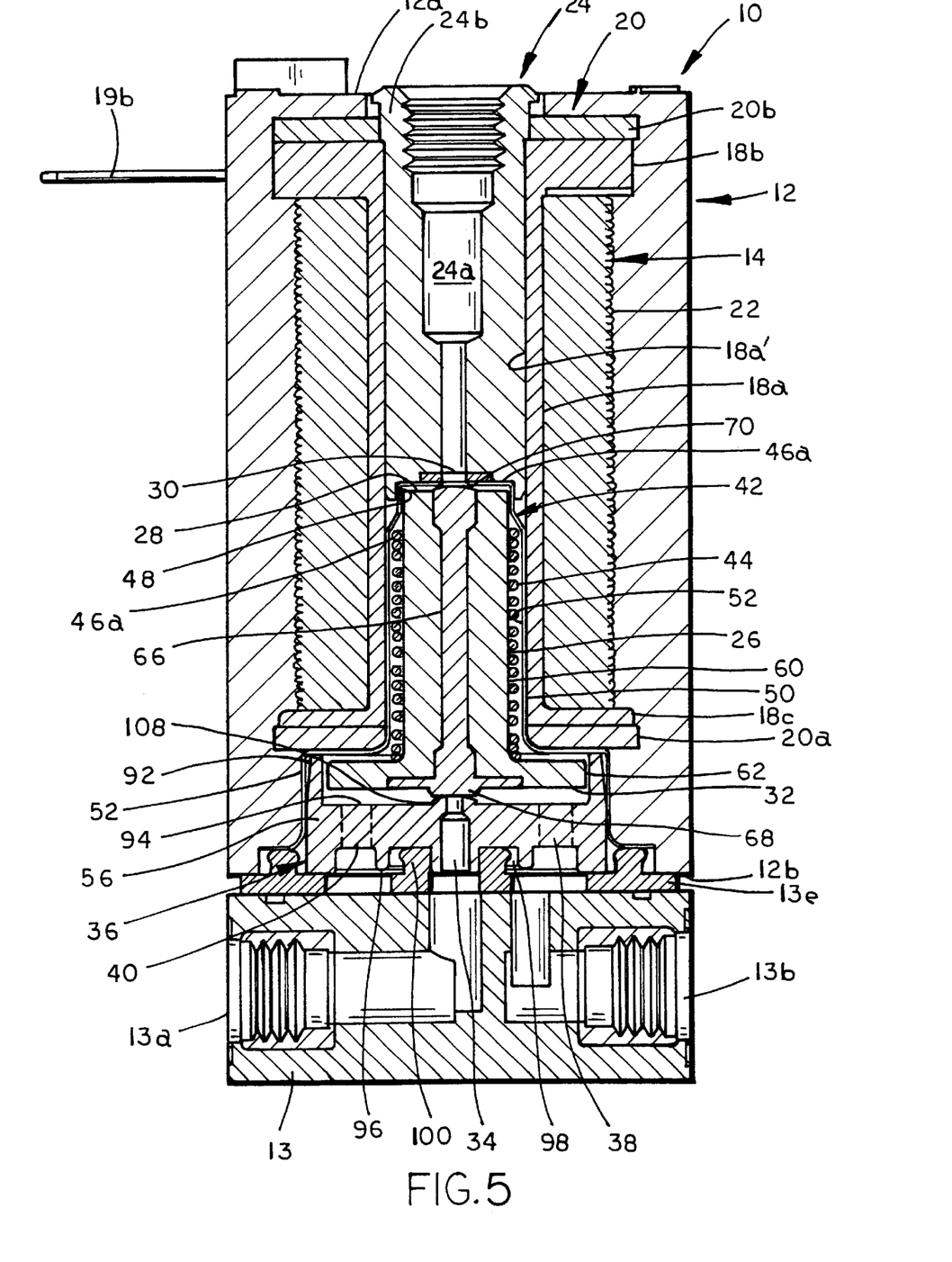
FIG. 5 is a cross-section view taken along line V—V of FIG. 2.

Referring to FIG. 1, the numeral 10 generally designates a plunger-type three-way solenoid valve assembly of the present invention. Solenoid valve assembly 10 consumes less power than conventionally known solenoid valves and, further, exhibits high cycling with small flows and low wattage requirements, which is particularly suitable for battery operation, micro processor controlled, and printed circuit board-type applications, including medical applications. In addition, as will be described more fully below, solenoid valve assembly 10 offers longer strokes with lower power requirements which is achieved at least in part by isolating the residual magnetism in the electromagnetic actuator from the plunger 26 (FIG. 5). In addition, the gap between plunger 26 and top cap 24 is minimized so that the amount of force needed to move plunger 26 can be controlled to lower the wattage requirements of the valve.

Figure 4:
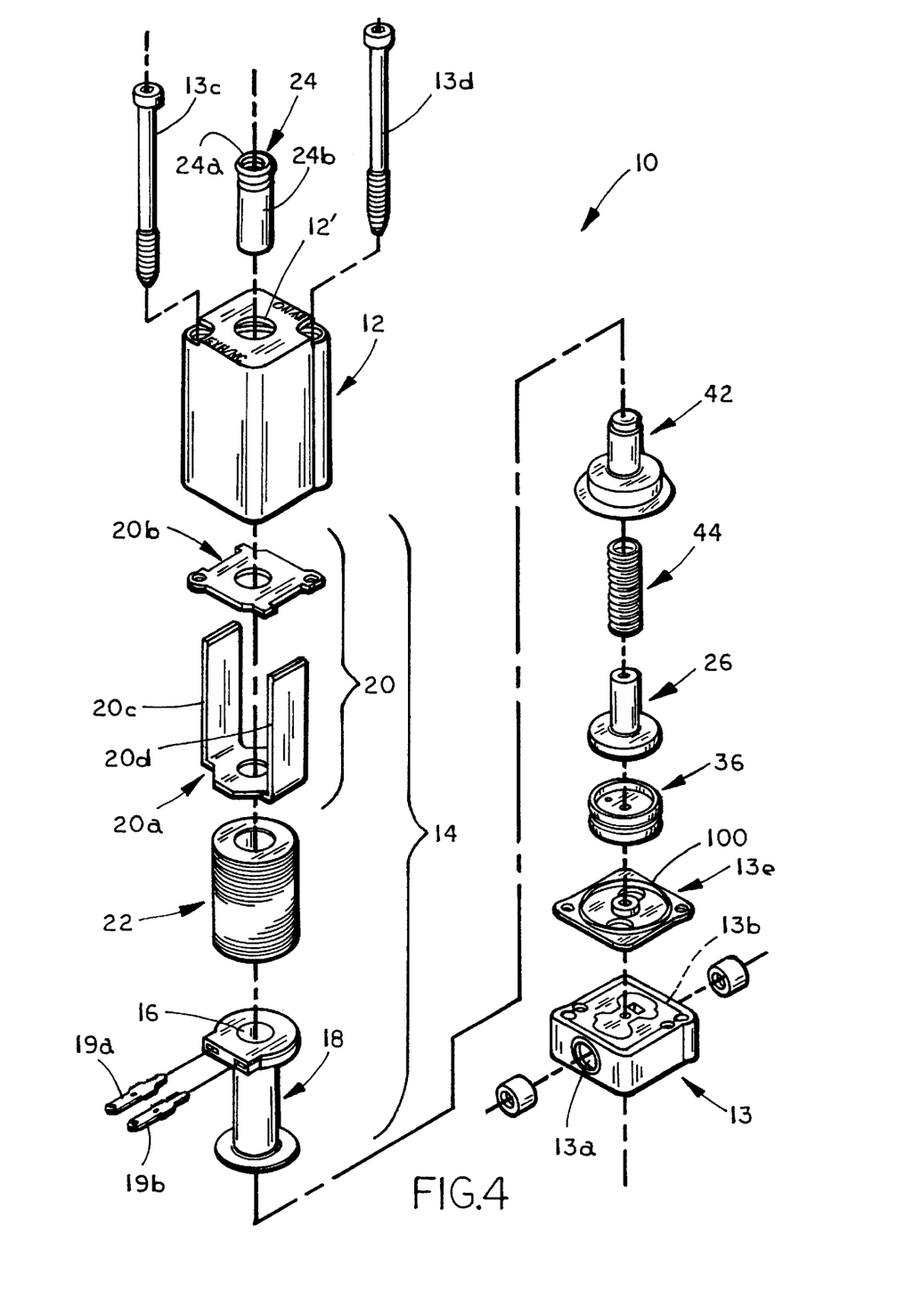
FIG. 4 is an exploded perspective view of the valve assembly of FIG. 1.

As best seen in FIGS. 4 and 5, valve assembly 10 comprises a three-way valve and includes a housing 12 and an adapter or base 13. Base 13 includes an inlet port 13a and an outlet port 13b and is secured to housing 12 by a pair of bolts 13c and 13d. Positioned between housing 12 and base 13 is a seal 13e. Also, positioned in housing 12 is a valve seat 36, plunger or armature 26, and the electromagnetic actuator, such as coil assembly 14. Valve seat insert 36 includes an inlet opening 34 and a pair of outlet openings 38, 40, with inlet opening 34 aligning with and in communication with inlet port 13a and outlet openings 38 and 40 in communication with outlet port 13b.

Figure 2:
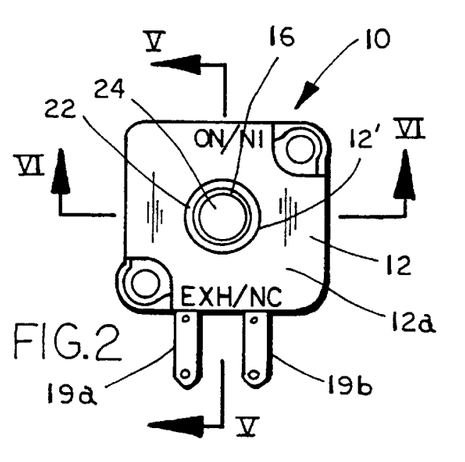
FIG. 2 is a top plan view of the valve assembly of FIG. 1.
Figure 3:
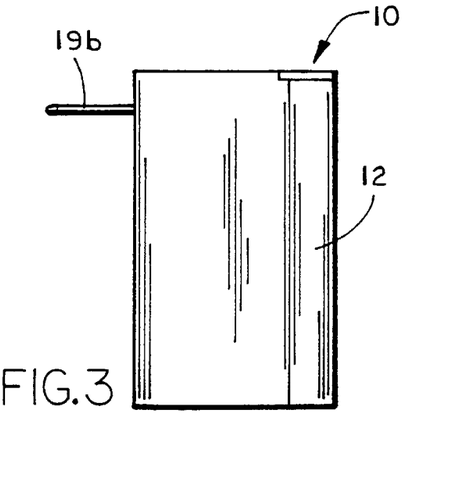
FIG. 3 is an elevation view of the solenoid valve of FIG. 1.
Figure 6:
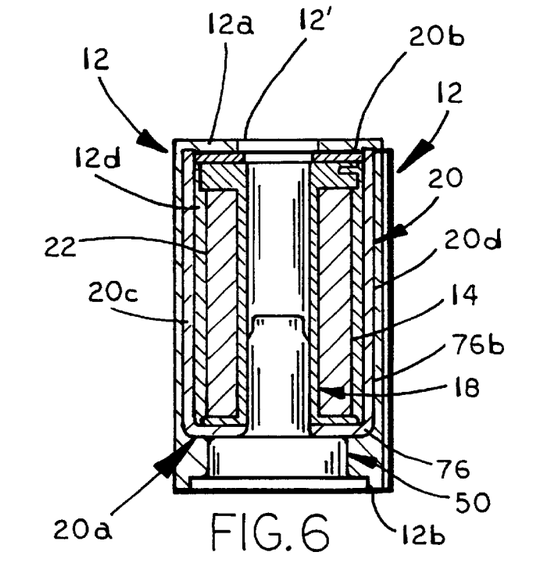
FIG. 6 is a cross-section view of the housing and coil assembly of the valve assembly of FIGS. 1–5; 10
Figure 12:
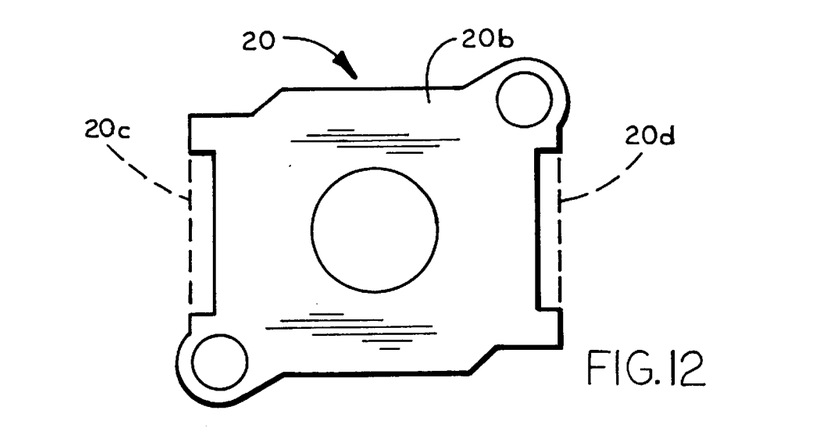
FIG. 12 is an enlarged top plan view of the coil assembly frame shown in FIG. 6.
Figure 13:
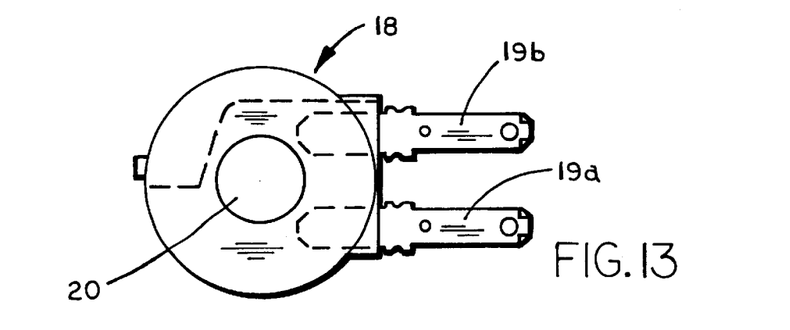
FIG. 13 is an enlarged top plan view of the bobbin illustrated in FIG. 6.
Figure 14:
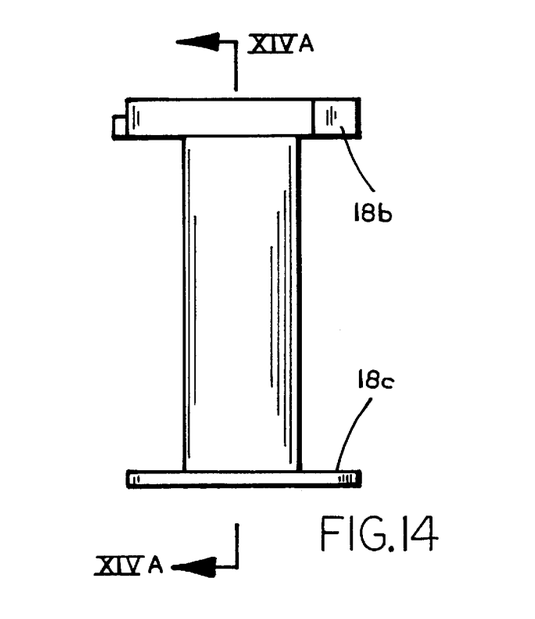
FIG. 14 is an elevation view of the bobbin illustrated in FIG. 13.
Figure 14A:
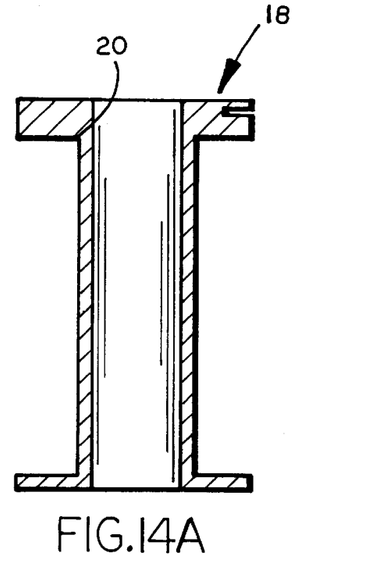
FIG. 14A is a cross-section view taken along line XIVA—XIVA of FIG. 14.

Coil assembly 14 (FIGS. 4 and 5) includes a bobbin or spool 18, which defines a transverse passage 16, a coil frame 20, which supports bobbin 18 in housing 12, and a coil 22. Bobbin 18 includes a pair of outwardly projecting conductive leads 19a and 19b (FIGS. 1, 2, and 13) which project through housing 12 (FIG. 7) for coupling to an external power supply. Coil frame 20 is preferably a steel frame and, as best in FIGS. 4, 6, and 12, includes a base 20a and a top plate 20b which are interconnected by a pair of upwardly extending arms 20c and 20d. Arms 20c and 20d are secured, such as by welding, to opposed sides of top plate 20b to form frame 20. Spool 18 is supported in frame 20, which is mounted by top plate 20b in upper wall 12a of housing 12. Bobbin 18 preferably comprises a glass filled bobbin and includes a sleeve portion 18a and upper and lower flanges 18b and 18c. Extending around sleeve portion 18a and captured between flanges 18b and 18c is a wire, which forms coil 22. Coil 22 is coupled to conductive leads 19a and 19b and when energized controls the movement of plunger 26 in passage 16 to control communication between inlet and outlet ports 13a and 13b.

A top cap or exhaust port body 24 extends through an opening 12' in upper wall 12a of housing 12 and is positioned in passageway 16. Top cap 24 includes a cylindrical body 24b and an exhaust passage 24a that extends through body 24b and provides an exhaust port for valve assembly 10. Top cap 24 preferably comprises a magnetic material, for example nickel plated steel.

Extending into passageway 16 from an opposed end of spool 18 is plunger or armature 26. Armature 26 similar preferably comprises a magnetic material, such as nickel plated steel. Armature 26 is supported for limited movement in passage 16 and moves between a first or open position in which an upper end 28 of armature 26 seals the opening or orifice 30 of exhaust passage 24a and a second or closed position in which upper end 28 is spaced from the orifice of exhaust passage 24a such that lower end 32 of armature 26 seals against inlet opening 34 to thereby close inlet port 13a (FIG. 5). When coil 22 is energized and current flows through coil 22, coil 22 generates a magnetic field around it. The strength of the magnetic flux or the magnetic field depends on the wire size, the amount of current flowing, and the number of turns of the wire. As the number of turns or loops increases, so too does the magnetic flux. This magnetic flux or field generates a force on the armature 26 to urge the armature 26 to move to the first position wherein upper end 28 of armature 26 seals exhaust passage 24a to open communication between inlet and outlet openings 34 and 38, 40 to thereby open valve assembly 10.

When coil 22 is de-energized, however, a residual magnetic field may remain in top cap 24 and in spool 18. In order to isolate armature 26 from the residual magnetic field, armature 26 is inserted into passage 16 in a non-magnetic member 42. Non-magnetic member 42 preferably comprises a non-magnetic liner, such as a non-magnetic stainless steel liner, brass liner, or aluminum liner or the like, and has a thickness preferably in a range of 0.003 to 0.007 inches. Most preferably, non-magnetic liner has a thickness of about 1/5000th of an inch and may be formed, for example, from a stamped non-magnetic stainless steel tube. Non-magnetic member 42 provides an air gap and a "fixed magnetic gap" between top cap 24 and armature 26 and between spool 18 and armature 26. Thus, when coil 22 is de-energized, armature 26 can break free from exhaust port body 24 and be quickly moved from its first or open position wherein upper portion 28 seals exhaust passage 24a to its second or closed position wherein lower portion 32 seals inlet opening 34.

Figures 15, 16, 16A:
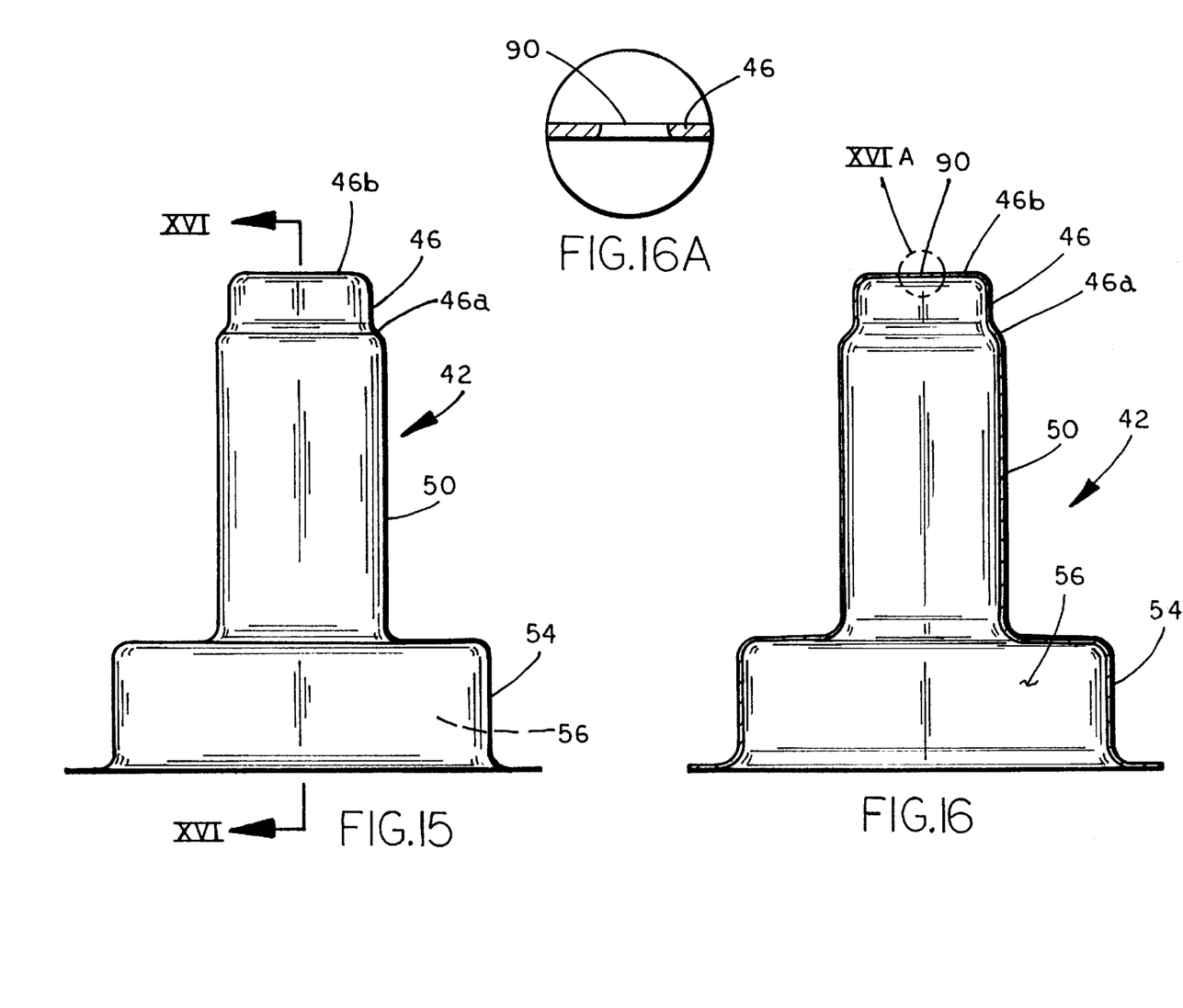
FIG. 15 is an enlarged elevation view of the non-magnetic member of FIG. 4.
FIG. 16 is a cross-section taken along line XVI—XVI of FIG. 15.
FIG. 16A is an enlarged view of region XVIA—XVIA of FIG. 16.
Figure 17:
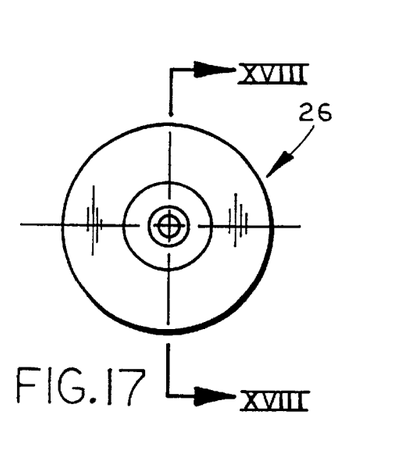
FIG. 17 is a bottom plan view of the armature illustrated in FIG. 6.
Figure 18:
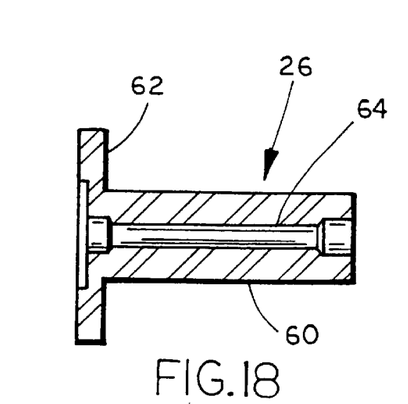
FIG. 18 is a cross-section view taken along line XVIII—XVIII of FIG. 17.
Figure 19:
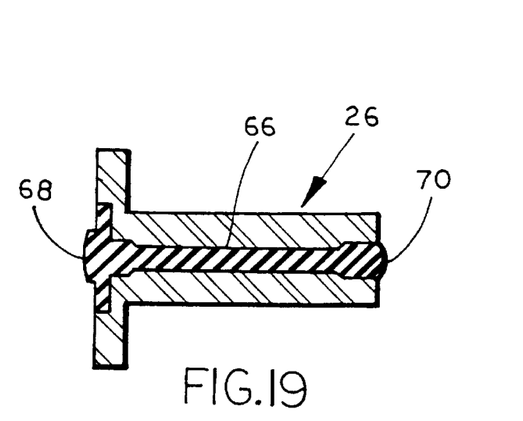
FIG. 19 is a similar view to FIG. 18 illustrating a valve seal positioned in the armature of FIGS. 17 and 18.

Armature 26 returns to its closed position under the force of a biasing member 44 which urges armature 26 to move away from top cap 24 and toward inlet port 34. In preferred form, biasing member 44 comprises a coil spring which is also positioned in non-magnetic member 42. As best seen in FIGS. 5, 15, and 16, non-magnetic member 42 comprises a generally cup-shaped member having a first cup-shaped portion 46 which is sized to extend into a lower recessed portion 48 of top cap 24. In this manner, non-magnetic member 42 permits armature 26 to be positioned in close proximity to top cap 24. Non-magnetic member 42 also includes an intermediate sleeve portion 50 which is spaced from armature 26 to form a spring cavity in which biasing member 44 is positioned, and a second cup-shaped portion 54 which defines a valve seat cavity 56 to hold valve seat insert 36, described in greater detail below. Thus, when coil 22 is de-energized, the spring force of biasing member 44 urges armature 26 to move in passage 16 to its closed position. It can be appreciated that with armature 26 magnetically isolated form the residual magnetic field, the spring force of biasing member 44 is minimized. In addition, referring again to FIGS. 16 and 16A, cup-shaped portion 46 includes an opening or orifice 90 to form a flow passage through non-magnetic member 42 to exhaust passage 24a. Thus, when armature 26 is moved to its second or closed position, a flow path is defined between outlet openings 38 and 40 and between armature 26 and non-magnetic member 42 through opening 90 so that valve 10 includes an exhaust path from outlet openings 38 and 40 through exhaust passage 24a.

Referring to FIGS. 5, and 17–19, armature 26 includes an elongate cylindrical portion or stem 60 and a flange portion 62 which together form an armature body with a T-shaped cross-section. Spring 44 extends around stem 60 and is captured between flange portion 62 and a transition portion 46a between cup-shaped portion 46 and intermediate portion 50 (FIG. 5) of non-magnetic member 42 and applies a spring force to flange portion 62 to urge armature 26 towards valve seat insert 36. Armature 26 preferably includes a transverse passage 64 (FIG. 18) for receiving an elastomeric member 66 (FIG. 19) which forms sealing surfaces 68 and 70 on its opposed ends for sealing inlet opening 34 and exhaust passage 24a, respectively. Elastomeric member 66 preferably comprises an elastomeric seal which is operational at low temperatures, for example at temperatures such s –50° C. and, more preferably, in a range of –50° C. to 50° C. Most preferably, elastomeric member comprises Nitrile having a shore A durometer in a range of about 50 to 100, more preferably, in a range of about 55 to 95, and, most preferably, in a range of about 75 to 85. In addition, sealing surfaces 68 and 70 preferably comprise spherical radiused sealing surfaces.

Figure 20:
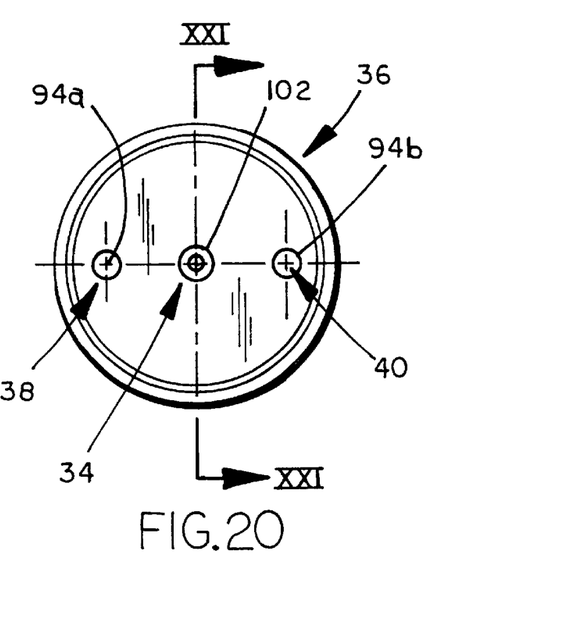
FIG. 20 is a bottom plan view of the seat insert illustrated in FIG. 6.
Figure 21:
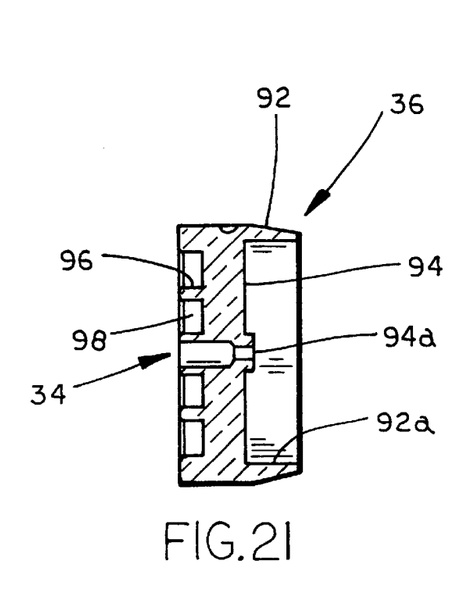
FIG. 21 is a cross-section view taken along line XXI—XXI of FIG. 20.

As best seen in FIGS. 20 and 21, valve seat insert 36 comprises a cup-shaped member with an outer annular wall 92 which extends around a central member 94 which includes transverse opening 94a, 94b, and 94c which respectively define inlet opening 34 and outlet openings 38 and 40. Central member 94 further includes an annular projecting rib 96 which extends around inlet opening 34 and which defines an annular groove 98 for receiving an annular seal portion 100 of seal 13e (FIGS. 4 and 5). Seal 100 is preferably formed from an elastomeric material similar to seal 66. Preferably, inlet opening 34 includes a raised sealing surface 108 for engagement by sealing surface 68 of plunger 26. In this manner, when plunger 26 is in its second or closed position, sealing surface 68 seals inlet opening 34 with lower surface 32 of armature 26 being spaced above central member 94 to permit communication between outlet openings 38 and 40. Annular wall 92 together with central member 94 form a cavity in which flange 62 is positioned for movement between the first and second positions. In addition, armature 26 is provided with an air gap between flange 62 and inner surface 92a of cylindrical wall 92 such that exhaust flow is permitted from outlet port 13b through openings 38 and 40 and exhaust passage 24a. Referring again to FIG. 5, valve seat insert 36 is preferably fully recessed in second end 12b of housing 12 and, further, fully recessed in third portion 54 of non-magnetic member 42. Thus, spring 44, plunger or armature 26, and valve seat insert 36 are all positionable in non-magnetic member 42 which provides for a simplified assembly process.

Figure 11:
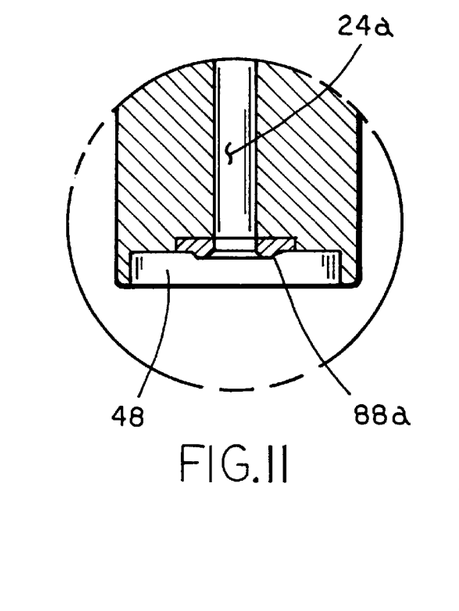
FIG. 11 is an enlarged end cross-section view of the top cap of FIG. 10.

Referring to FIGS. 8–11, exhaust port body or top cap 24 includes a cylindrical portion 86 with a mounting flange 88 formed on one end and recessed portion 48 formed on its opposed end. As best seen in FIG. 11, exhaust port body 24 preferably includes an annular seal 88a which extends around exhaust passageway 24a. Seal 88a preferably comprises Nitrile having shore A durometer in a range of approximately 50 to 100, more preferably, 55 to 95, and most preferably in a range of approximately 75 to 85. In addition, as noted in reference to elastomeric member 66, seal 88a preferably comprises an elastomeric material which is operational at low temperatures, such as –50° C. and, more preferably, in a range of –50° C. to 50° C. In preferred form, seal 88a includes a spherical sealing surface, which seals against upper surface 46b of cup-shaped portion 46 around orifice 90. In this manner, when armature 26 is moved to its first position, seals 88a and 66 seal exhaust passage 24a. It can be appreciated from the foregoing descriptions and drawings, that armature 26, spring 24, and valve seat insert 56 may be quickly and easily assembled into non-magnetic member 42. In addition, by minimizing the gap between the plunger and the top cap, the amount of force needed to move the plunger is reduced to thereby lower the wattage requirements of the valve assembly. Further, by isolating the residual magnetism in coil assembly 14 from armature or plunger 26, the spring force needed to move the armature can be reduced which further reduces the wattage requirement. Therefore, the stroke can be increased without increasing the wattage requirements beyond desired maximum levels. For example, the present solenoid valve achieves strokes on the order of 0.007 inches and yet only requires 0.5 watts. Strokes of 0.030 can be achieved with 0.5 watts. In effect, the stroke length for a given wattage can be doubled over conventional solenoid valves.

While one form of the invention has been shown and described, modifications will be apparent to those skilled in the art. For example, the coil assembly may be varied, including the configuration of the frame and spool. The adapter or base can similarly be varied, for example, the inlet and outlet ports my be repositioned and aligned on a common side of the base. The embodiment described herein is only exemplary and not intended to limit the scope of the invention, which is, instead, defined by the claims that follow.

I claim:

1. An electrically-operated three-way plunger-type solenoid valve assembly comprising:

a housing defining an interior chamber and having an inlet port and an outlet port;

an electromagnetic actuator positioned in said interior chamber, said electromagnetic actuator defining a transverse sleeve passage therethrough and being adapted to be selectively energized to generate a magnetic field;

an exhaust port body having an exhaust passage extending therethrough and defining an exhaust port, said exhaust port body extending into said sleeve passage;

a non-magnetic member positioned in said sleeve passage and having an orifice in communication with said exhaust passage;

a plunger positioned in said non-magnetic member and supported for reciprocal axial movement in said non-magnetic member between a first position and a second position, said plunger sealing said orifice and sealing said exhaust passage when moved to said first position and said inlet port and said outlet port being in communication thereby opening said valve assembly, and when said plunger is moved to said second position said outlet port is in communication with said exhaust port through said exhaust passage and said plunger seals said inlet port whereby said valve assembly is closed; and a biasing member applying a spring force to said plunger to urge said plunger to said second position, said electromagnetic actuator generating a magnetic field having sufficient magnitude to move said plunger against said force of said biasing member to move said plunger to said first position when said electromagnetic actuator is energized to selectively move said plunger between said first and second positions to control the communication between said inlet port and said outlet port, and said non-magnetic member providing a magnetic gap between said plunger and said electromagnetic actuator and said exhaust port body to isolate said plunger from a residual magnetic field remaining in said electromagnetic actuator and said exhaust port body after said electromagnetic actuator is de- energized thereby reducing the required spring force of the biasing member and, further, forming a quick response valve.

2. The electrically-operated three-way plunger-type solenoid valve assembly according to claim 1, wherein said electromagnetic actuator includes a spool, said spool defining said transverse sleeve passage therethrough.

3. The electrically-operated three-way plunger-type solenoid valve assembly according to claim 2, wherein said spool includes end flanges, said electromagnetic actuator further including wire coiled around said spool and extending between said end flanges.

4. The electrically-operated three-way plunger-type solenoid valve assembly according to claim 2, further comprising a coil frame, said frame supporting said spool in said interior chamber of said housing.

5. The electrically-operated three-way plunger-type solenoid valve assembly according to claim 1, wherein said plunger has a generally T-shaped configuration having a cylindrical stem and a flange, said stem extending into said sleeve passage and having a first sealing surface to seal said orifice of said non-magnetic member when said plunger is moved to said first position, and said flange having a second sealing surface for sealing said inlet port when said plunger is moved to said second position.

6. The electrically-operated three-way plunger-type solenoid valve assembly according to claim 5, wherein said stem includes a seal member providing said first sealing surface.

7. The electrically-operated three-way plunger-type solenoid valve assembly according to claim 5, wherein said flange includes a seal member providing said second sealing surface.

8. The electrically-operated three-way plunger-type solenoid valve assembly according to claim 5, wherein said plunger includes a longitudinal passage and a unitary seal positioned in said passage, said unitary seal providing said first and second sealing surfaces.

9. The electrically-operated three-way plunger-type solenoid valve assembly according to claim 1, wherein said non-magnetic member comprises a stainless steel member.

10. The electrically-operated three-way plunger-type solenoid valve assembly according to claim 1, wherein said non-magnetic member includes a generally cup-shaped body having a first portion extending into said exhaust port body and receiving a portion of said plunger whereby said plunger is in close proximity to said exhaust port body.

11. The electrically-operated three-way plunger-type solenoid valve assembly according to claim 10, wherein said generally cup-shaped body includes a second portion, said second portion being spaced from said plunger and forming a cavity therebetween, said biasing member being positioned in said cavity and urging said plunger toward said inlet port to seal said inlet port.

12. The electrically-operated three-way plunger-type solenoid valve assembly according to claim 11, wherein said biasing member comprising a coil spring.

13. The electrically-operated three-way plunger-type solenoid valve assembly according to claim 11, further comprising a valve seat having an inlet opening and an outlet opening in communication with said inlet and outlet ports respectively, said generally cup-shaped body including a third portion, said valve seat insert extending into and being seated in said third portion of said non-magnetic member.

14. The electrically-operated three-way plunger-type solenoid valve assembly according to claim 1, wherein said non-magnetic member comprises a generally cup-shaped non-magnetic body having a first cup-shaped portion for receiving a first portion of said plunger in close relationship therewith, a sleeve portion spaced radially outward from said first cup-shaped portion to form a spring cavity for holding said biasing member, and a second cup-shaped portion for receiving a second portion of said plunger in close relationship therewith.

15. The electrically-operated three-way plunger-type solenoid valve assembly according to claim 14, wherein said first cup-shaped portion includes said orifice for communicating with said exhaust passage in said exhaust port body.

16. The electrically-operated three-way plunger-type solenoid valve assembly according to claim 15, wherein said generally cup-shaped body includes a wall, said wall having a thickness in a range of 0.003 to 0.007 inches.

17. An electrically-operated three-way plunger-type solenoid valve assembly comprising:

a housing;

a base having an outlet port and an inlet port, said base secured to said housing;

a coil assembly being positioned in said housing and being adapted to be selectively energized to generate a magnetic field and having a transverse sleeve passage provided therethrough;

an exhaust port body extending into one end of said sleeve passage and having an exhaust passage extending therethrough, said exhaust passage defining an exhaust port;

a non-magnetic member positioned in a second end of said sleeve passage, said non-magnetic member having an orifice in communication with said exhaust passage of said exhaust port body;

a valve seat insert having an inlet opening and an outlet opening, said inlet opening and said outlet opening being in communication with said inlet and outlet ports, respectively, said insert recessed in said non-magnetic member in said housing;

a plunger positioned in said non-magnetic member between said orifice of said non-magnetic member and said insert and supported for reciprocal axial movement in said sleeve passage between a first position wherein said plunger seals said orifice thereby sealing said exhaust passage and wherein said plunger is spaced from said valve seat insert and allowing communication between said inlet and outlet openings thereby opening said valve assembly and a second position wherein said plunger seals said inlet opening whereby said valve assembly is closed, and said outlet opening is in communication with said exhaust port; and a biasing member applying a force to said plunger to urge said plunger to said second position, said coil assembly generating a magnetic field having sufficient magnitude to move said plunger against said force of said biasing member to move said plunger to said first position when said coil assembly is energized to selectively move said plunger between said first and second positions to control the communication between said inlet port, said outlet port and said exhaust port, and said plunger, said biasing member, and said valve seat insert being positionable in said non-magnetic member to provide a simplified assembly process.

18. The electrically-operated three-way plunger-type solenoid valve assembly according to claim 17, wherein said non-magnetic member comprises a cup-shaped liner.

19. The electrically-operated three-way plunger-type solenoid valve assembly according to claim 18, wherein the liner comprises a stainless steel liner.

20. The electrically-operated three-way plunger-type solenoid valve assembly according to claim 18, wherein said liner has a thickness in a range of 0.003 to 0.007 inches.

21. The electrically-operated three-way plunger-type solenoid valve assembly according to claim 17, wherein said exhaust passage includes an exhaust orifice, said exhaust port body having a recessed annular surface extending around said exhaust orifice of said exhaust passage and defining a recess, and a portion of said non-magnetic member extending into said recess.

22. The electrically-operated three-way plunger-type solenoid valve assembly according to claim 21, wherein said portion of said non-magnetic member is seated in said recess and defines an exhaust path through said orifice of said non-magnetic member and said orifice of said exhaust passage.

23. The electrically-operated three-way plunger-type solenoid valve assembly according to claim 21, wherein said plunger extends into said portion when said plunger moves to said first position to thereby position said plunger in close proximity to said exhaust port body thus reducing the wattage requirements of said valve assembly.

24. The electrically-operated three-way plunger-type solenoid valve assembly according to claim 23, wherein said plunger includes a sealing surface sealing said orifice of said non-magnetic member when said plunger moves to said first position.

25. The electrically-operated three-way plunger-type solenoid valve assembly according to claim 17, wherein said biasing member comprises a spring, said non-magnetic member defining a spring cavity adjacent said plunger, said spring positioned in said spring cavity to urge said plunger to said second position.

26. The electrically-operated three-way plunger-type solenoid valve assembly according to claim 17, wherein said non-magnetic member includes a generally cup-shaped body having an end wall with said orifice formed therein and an open end, said open end positioned at an open end of said housing to ease assembly of said valve assembly.

27. The electrically-operated three-way plunger-type solenoid valve assembly according to claim 26, wherein said valve seat insert is positioned and recessed in said open end of said non-magnetic member.

28. An electrically-operated three-way plunger-type solenoid valve assembly comprising:

a housing defining an interior chamber, said housing having a first end and a second end;

a base mounted to said housing at said first end of said housing and including an inlet port and an outlet port;

a coil assembly positioned in said interior chamber and being adapted to be selectively energized to generate a magnetic field, said coil assembly having a transverse sleeve passage therethrough, said transverse sleeve passage extending into said housing from said second end of said housing;

an exhaust port body positioned in said second end of said housing and extending into said sleeve passage and having an exhaust passage extending therethrough;

a plunger positioned in said sleeve passage and positioned between said exhaust body and said base for reciprocal axial movement in said sleeve passage between a first position and a second position, said plunger sealing said exhaust passage when moved to said first position and permitting communication between said inlet port and said outlet port thereby opening said valve assembly, and said plunger sealing said inlet port being spaced from said orifice and permitting communication between said outlet port and said exhaust port and when moved to said second position whereby said valve assembly is closed;

a biasing member apply a spring force to said plunger to urge said plunger to move to said second position, said coil assembly generating a magnetic field having sufficient magnitude to move said plunger against said force of said biasing member to move said plunger to said first position when said coil assembly is energized to selectively move said plunger between said first and second positions to control the communication between said inlet port and said outlet port; and a non-magnetic member positioned between said plunger and said exhaust port body and between said plunger and said coil assembly, said non-magnetic member providing a magnetic gap between said plunger and said exhaust port body and between said coil assembly and said plunger to magnetically isolate said plunger from a residual magnetic field remaining in said coil assembly and said exhaust body after said coil assembly is de-energized thereby reducing the required magnitude of said spring force and, further, forming a quick response valve.

29. The electrically-operated three-way plunger-type solenoid valve assembly according to claim 28, wherein said biasing member is positioned between said non-magnetic member and said plunger.

30. The electrically-operated three-way plunger-type solenoid valve assembly according to claim 28, wherein said plunger extends into a recess in said exhaust port body whereby said plunger and said exhaust port body are in close proximity.

31. The electrically-operated three-way plunger-type solenoid valve assembly according to claim 30, wherein said non-magnetic member comprises a non-magnetic liner, said liner including an orifice in communication with said exhaust passage.

32. The electrically-operated three-way plunger-type solenoid valve assembly according to claim 31, wherein said liner has a stepped profile having a first portion extending into said recess and being in close proximity to an upper portion of said plunger and providing an air gap between said plunger and said exhaust port body, a second portion spaced from said plunger and defining a spring cavity therebetween, a third portion in close proximity with a lower portion of said plunger and defining an air gap therebetween.

33. The electrically-operated three-way plunger-type solenoid valve assembly according to claim 31, wherein said liner has a thickness in a range of 0.003 to 0.007 inches.

34. The electrically-operated three-way plunger-type solenoid valve assembly according to claim 28, wherein said coil assembly includes a spool and a wire wound around said spool to form a coil, said coil being adapted to be energized by an external power source.

35. The electrically-operated three-way plunger-type solenoid valve assembly according to claim 34, wherein said coil assembly further includes a frame, said frame supporting said spool and said coil in said housing.

36. The electrically-operated three-way plunger-type solenoid valve assembly according to claim 34, wherein said spool includes a pair of conductive leads projecting through said housing, said conductive leads coupled to said coil and being adapted to be energized by an external power source to energize said coil.

37. The electrically-operated three-way plunger-type solenoid valve assembly according to claim 28, wherein said non-magnetic member includes a generally cup-shaped body.

38. The electrically-operated three-way plunger-type solenoid valve assembly according to claim 28, wherein said biasing member comprises a spring.

39. The electrically-operated three-way plunger-type solenoid valve assembly according to claim 28, further comprising a valve seat insert positioned in said housing, said valve seat insert having an inlet opening and an outlet opening, said inlet opening being in communication with said inlet port, said outlet opening being in communication with said outlet port, and said plunger sealing said inlet opening when moved to said second position thereby sealing said outlet port.

40. The electrically-operated three-way plunger-type solenoid valve assembly according to claim 39, wherein said valve seat insert is positioned in said non-magnetic member.

41. An insert for an electrically-operated three-way solenoid valve assembly, the valve assembly including a housing having an inlet port and outlet port, an electromagnetic actuator having a sleeve passage and positioned in the housing, a plunger supported for reciprocal movement in the sleeve passage, an exhaust port body positioned in the sleeve passage and defining an exhaust path therethrough, and a biasing member applying a spring force to the plunger to urge the plunger to a first position wherein the plunger seals the inlet port thereby closing the valve, the electromagnetic actuator moving the plunger against the force of the biasing member to move the plunger to a second position wherein the inlet and outlet ports are in communication to thereby open the valve, said insert comprising:

a generally cup-shaped non-magnetic body having a first cup-shaped portion for receiving a first portion of the plunger in close relationship therewith, a sleeve portion spaced radially outward from the first cup-shaped portion to form a spring cavity for holding the biasing member, and a second cup-shaped portion for receiving a second portion of the plunger in close relationship therewith.

42. The insert according to claim 41, wherein said first cup-shaped portion includes an orifice for communicating with the exhaust path in the exhaust port body.

43. The insert according to claim 42, wherein said generally cup-shaped non-magnetic body comprises a non-magnetic stainless steel material.

44. The insert according to claim 42, wherein said generally cup-shaped body includes a wall, said wall having a thickness in a range of 0.003 to 0.007 inches.

45. The insert according to claim 41, wherein said second cup-shaped portion is sized for receiving a valve seat insert, with the valve seat insert including an inlet opening in communication with the inlet port and including an outlet opening in communication with the outlet port.

46. A valve assembly comprising:

a housing having an inlet port and an outlet port;

an electromagnetic actuator having a sleeve passage and being positioned in said housing;

a plunger supported for reciprocal movement in said sleeve passage;

an exhaust port body positioned in said sleeve passage and defining an exhaust path therethrough;

a biasing member applying a spring force to said plunger to urge said plunger in a first position wherein said plunger seals said inlet port thereby closing said valve assembly, said electromagnetic actuator moving said plunger against the force of said biasing member to move said plunger to a second position wherein said inlet and said outlet ports are in communication to thereby open said valve assembly when said actuator is energized; and an insert comprising a generally cup-shaped non-magnetic body having a first cup-shaped portion for receiving a first portion of said plunger in close relationship therewith, a sleeve portion spaced radially outward from said first cup-shaped portion to form a spring cavity for holding said biasing member, and a second cup-shaped portion for receiving a second portion of said plunger in close relationship therewith.

47. The valve assembly according to claim 46, wherein said first cup-shaped portion includes an orifice for communicating with said exhaust path and said exhaust port body.

48. The valve assembly according to claim 47, wherein said generally cup-shaped non-magnetic body comprises a non-magnetic stainless steel material.

49. The valve assembly according to claim 48, wherein said generally cup-shaped non-magnetic body includes a wall having a thickness in a range of 0.003 to 0.007 inches.

50. The valve assembly according to claim 46, further comprising a valve seat insert, wherein said second cup-shaped portion is sized for receiving said valve seat insert, said valve seat insert including an inlet opening in communication with said inlet port and including an outlet opening in communication with said outlet port.

* * * * *

UNITED STATES PATENT AND TRADEMARK OFFICE
CERTIFICATE OF CORRECTION

PATENT NO. : 6,405,757 B1  
APPLICATION NO. : 09/631143  
DATED : June 18, 2002  
INVENTOR(S) : Leonard J. Jabcon Page 1 of 1

Figure 7:
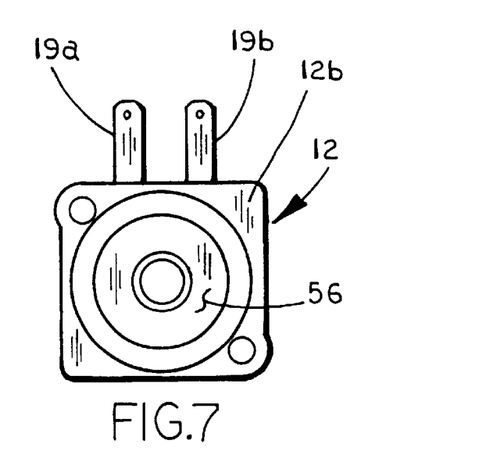
FIG. 7 is a bottom plan view of the housing of FIG. 6.
Figure 8:
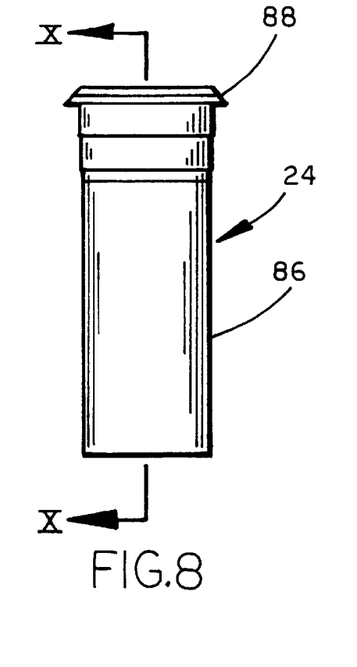
FIG. 8 is an enlarged elevation view of the top cap illustrated in FIG. 5.
Figure 9:
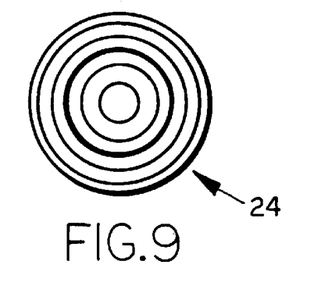
FIG. 9 is a top plan view of the top cap of FIG. 8.
Figure 10:
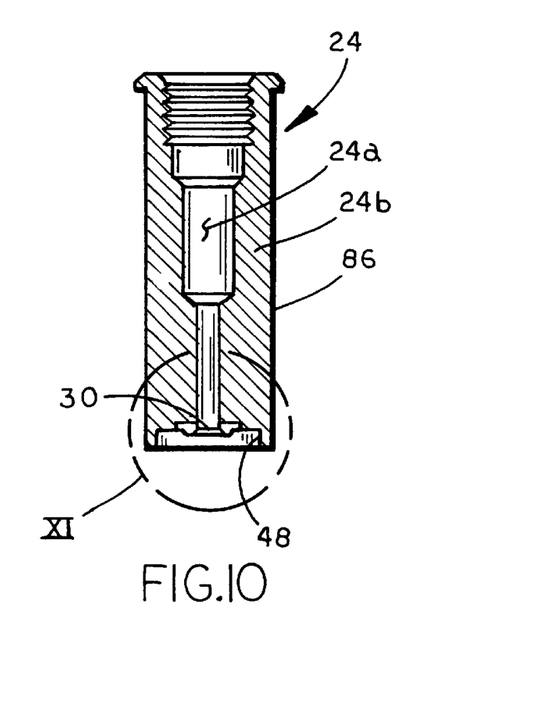
FIG. 10 is a cross-section view taken along line X—X of FIG. 8.

It is certified that error appears in the above-identified patent and that said Letters Patent is hereby corrected as shown below:

Column 4  
Line 58, Delete "10" before "FIG. 7".

Signed and Sealed this

Twenty-third Day of September, 2008

JON W. DUDAS  
*Director of the United States Patent and Trademark Office*